United States Patent [19]
Dreisbach

[11] Patent Number: 5,820,215
[45] Date of Patent: Oct. 13, 1998

[54] CHILD SAFETY SEAT ADAPTER

[76] Inventor: Kurt R. Dreisbach, 3444 Countyline Rd., Holly, Mich. 48442

[21] Appl. No.: 848,214

[22] Filed: Apr. 29, 1997

[51] Int. Cl.$^6$ ....................................................... B60N 2/28
[52] U.S. Cl. .................................... 297/256.16; 297/188.2
[58] Field of Search .......................... 297/188.01, 188.2, 297/216.11, 256.16, 250.1

[56] References Cited

U.S. PATENT DOCUMENTS

| | | | |
|---|---|---|---|
| 3,295,887 | 1/1967 | Bacon | 297/188.2 |
| 3,515,431 | 6/1970 | Grady . | |
| 4,359,004 | 11/1982 | Chappell | 297/188.2 X |
| 4,733,909 | 3/1988 | Single, II et al. . | |
| 4,813,751 | 3/1989 | Fenn | 297/188.2 X |
| 4,943,113 | 7/1990 | Meeker . | |
| 5,052,750 | 10/1991 | Takahashi et al. . | |
| 5,277,472 | 1/1994 | Freese et al. . | |
| 5,332,285 | 7/1994 | Sinnhuber . | |
| 5,466,044 | 11/1995 | Barley et al. . | |
| 5,478,135 | 12/1995 | Kain . | |
| 5,487,588 | 1/1996 | Burleigh et al. . | |
| 5,549,353 | 8/1996 | Gaudet et al. | 297/256.16 X |
| 5,667,272 | 9/1997 | Sutton | 297/188.2 X |

FOREIGN PATENT DOCUMENTS

| | | | |
|---|---|---|---|
| 4137599 | 5/1993 | Germany | 297/256.16 |

Primary Examiner—Peter R. Brown
Attorney, Agent, or Firm—Young & Basile, P.C.

[57] ABSTRACT

An adapter to facilitate the mounting a child safety seat on a narrow vehicular seat assembly such as encountered in the rear bench seat of an extended cab pick-up. The adapter is formed as an injected molded plastic part and includes a platform portion defining a seat support surface having a width at least as great as the width of the safety seat and a leg portion extending downwardly from a front edge of the platform portion for engagement with the floor of the vehicle at a location forwardly of a front edge of the seat cushion. The leg operates to position the platform portion in overlying relation to the seat cushion with a front edge of the seat support surface positioned forwardly of the front edge of the seat cushion whereby to provide a support surface in overlying relation to the seat cushion having a width sufficient to totally support the safety seat. The adapter further includes a tail portion extending rearwardly from a rear edge of the platform portion and sized to be positioned in a crease between a lower edge of the seat back and a rear edge of the seat cushion, whereby to facilitate positioning of the adapter on the seat assembly and retention of the adapter relative to the seat assembly. A seat belt assembly passing through a suitable aperture in the safety seat serves to secure the safety seat to the adapter and secure the adapter to the seat cushion.

9 Claims, 2 Drawing Sheets

CHILD SAFETY SEAT ADAPTER

BACKGROUND OF THE INVENTION

This invention relates to child safety restraint seats and more particularly to an adapter to allow the use of a child safety restraint seat in narrow bench seat environments.

Child restraint safety seat systems for motor vehicles are well known and are available in a variety of shapes and designs for both child and infant use. However, none of the prior art restraint seats are adaptable for use on short-bench seats found, for example, in the rear of extended cab pick-up trucks. Specifically, the bench seats in the rear of extended cab pick-up trucks are typically too short, as measured along the longitudinal axis of the vehicle, to provide sufficient support at the leading edge of the child restraint seat with the result that the standard safety seats tip forward and are very unstable both when in use or when not in use.

SUMMARY OF THE INVENTION

This invention is directed to the provision of an improved child safety seat assembly.

More specifically, this invention is directed to the provision of an adapter to facilitate the use of standard child safety seats in short bench seat environments.

The adapter of the invention is for use in installing a child restraint safety seat on a vehicle seat assembly of the type including a seat back and a seat cushion positioned on a floor of the vehicle and having a length less than the length of the child restraint safety seat.

According to the invention, the adapter comprises a stabilizing device including a platform portion, defining a seat support surface having a length at least as great as the length of the child restraint safety seat, and a leg portion extending downwardly from a front edge of the platform portion for engagement with the floor of the vehicle at a location forwardly of a front edge of the seat cushion and operative to position the platform portion in overlying relation to the seat cushion with a front edge of the seat support surface positioned forwardly of the front edge of the seat cushion. The adapter thus functions to provide a support surface in overlying relation to the seat cushion having a length sufficient to totally support the child seat in a position forwardly of the seat back. This arrangement provides strong support along the entire footprint of the safety seat, including the leading edge of the safety seat, whereby to preclude the unstable forward tipping problems encountered when prior art standard safety seats are utilized in a narrow bench seat environment.

According to a further feature of the invention, the stabilizing device further includes a tail portion extending rearwardly from a rear edge of the platform portion and sized to be positioned in the crease between a lower edge of the seat back and a rear edge of the seat cushion. The tail portion thus facilitates positioning of the adapter on the vehicle seat assembly and serves to retain the adapter in place when the safety seat is not in use.

According to a further feature of the invention, the vehicle floor includes a drive shaft tunnel and the leg portion of the stabilizing device includes a cut-out along a lower edge thereof sized to accommodate the drive shaft tunnel and allow the leg portion to straddle the drive shaft tunnel. This specific leg configuration provides firm positive support for the leading edge of the platform portion of the stabilizing device.

The invention further provides an improved vehicle seat assembly for use in seating children and infants within a vehicle. The seat assembly of the invention includes a seat cushion positioned in overlying relation to a floor of the vehicle; a seat back extending upwardly from a rear edge of the seat cushion; a stabilizing device including a platform portion positioned in overlying relation to the seat cushion and a leg portion extending downwardly from a front edge of the platform portion for engagement with the floor of the vehicle; and a child restraint seat positioned on the platform portion of the stabilizing device. This vehicle seat assembly arrangement provides firm positive support for a child restraint seat even in narrow bench seat environments.

According to a further feature of the invention, the seat assembly further includes a seat belt adapted to be secured to the vehicle and engaging the child restraint seat to press the child restraint seat downwardly against the platform portion. This arrangement allows the standard seat belt to secure the child restraint seat to the platform portion of the stabilizing device.

DETAILED DESCRIPTION OF THE PREFERRED EMBODIMENT

Figure 1:
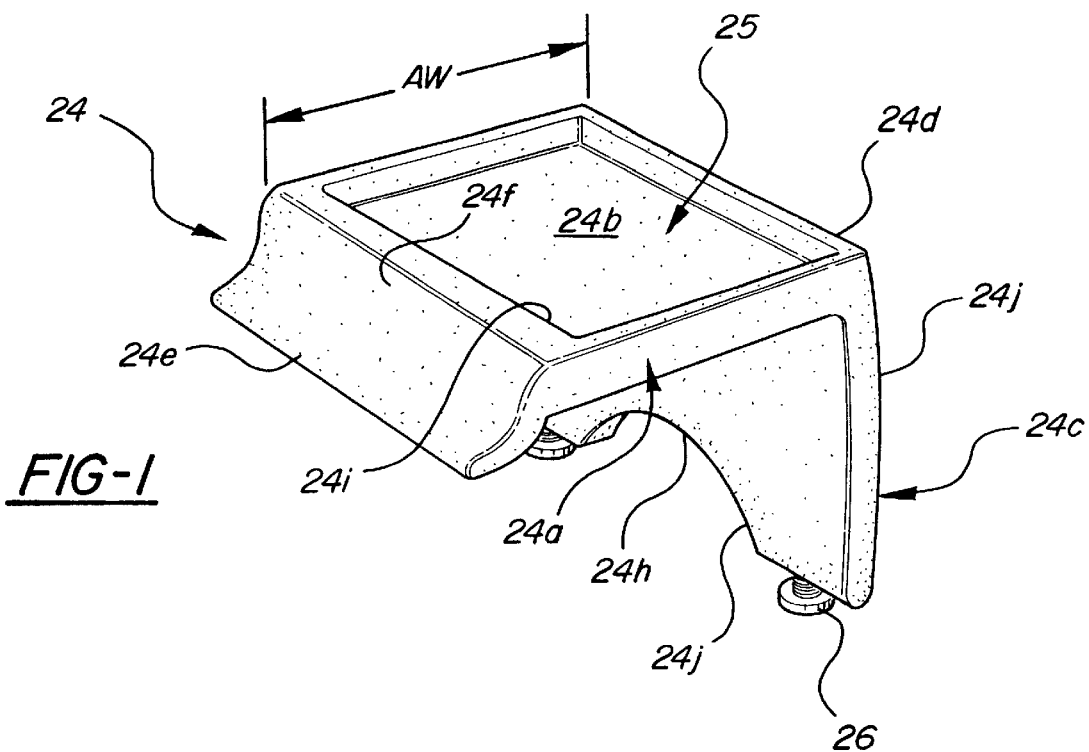
FIG. 1 is a perspective view of an adapter according to the invention.
Figure 2:
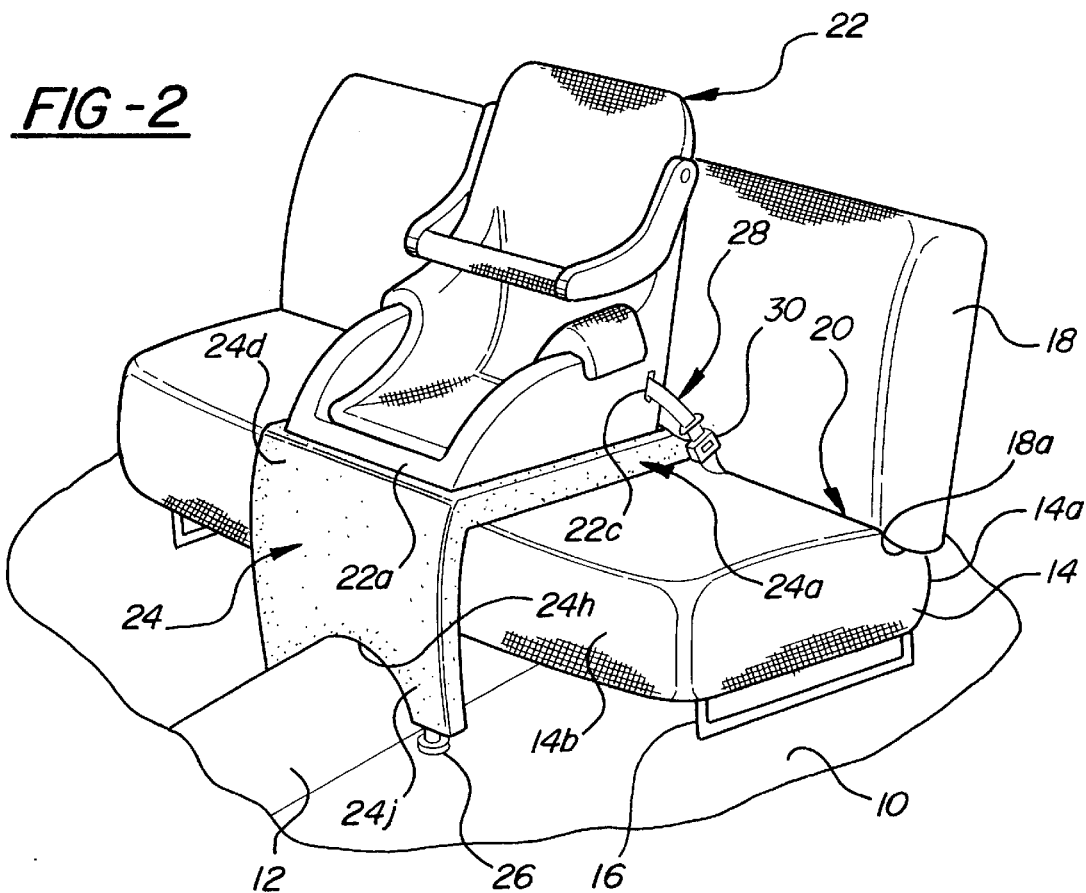
FIG. 2 is a perspective view of a vehicular seat assembly utilizing the invention adapter.
Figure 3:
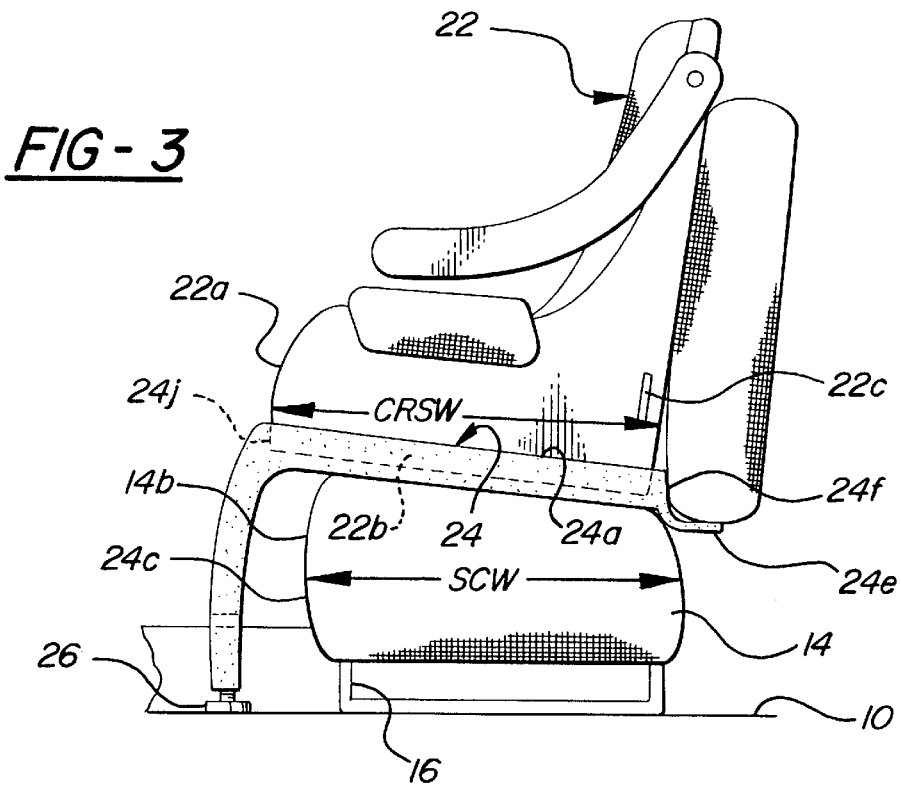
FIG. 3 is a side elevational view showing installation of the adapter in a vehicle seat assembly.
Figure 4:
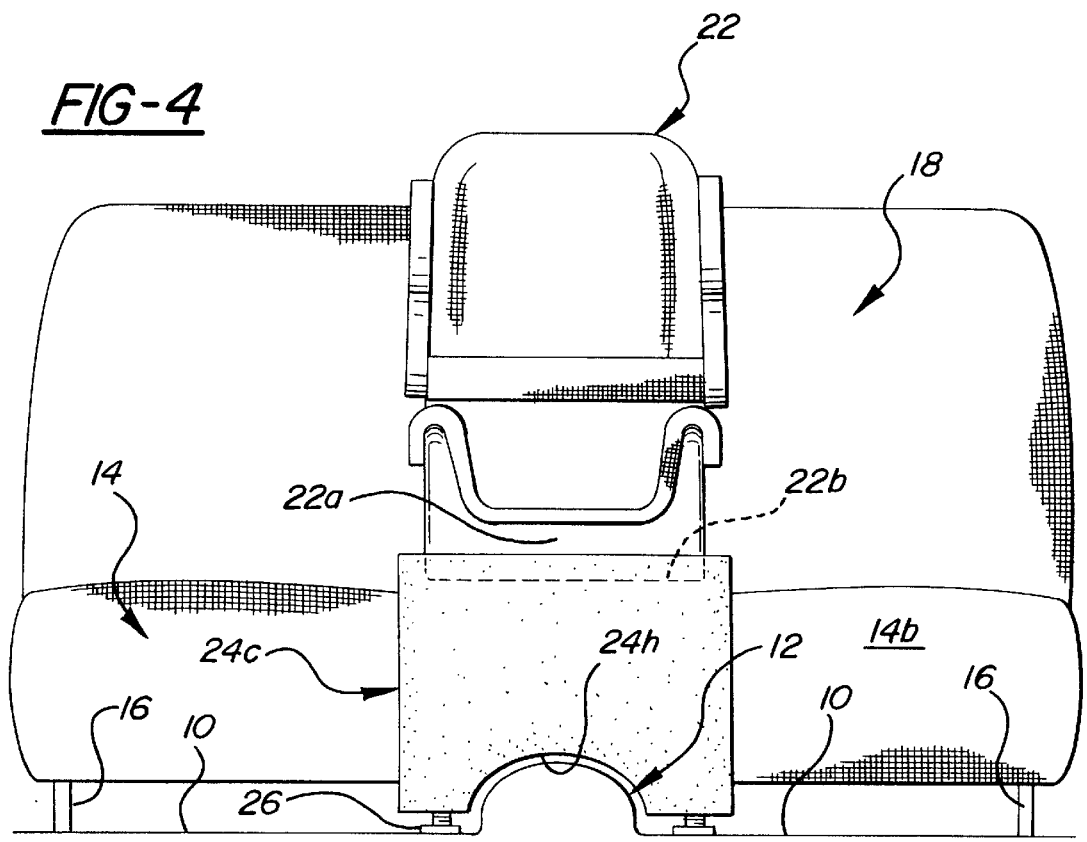
FIG. 4 is a front elevational view of the vehicular seat assembly.

The invention is illustrated in FIG. 2 in association with a motor vehicle of the type including a floor 10, a drive shaft tunnel 12, a seat cushion 14 positioned in overlying relation to the floor 10 by frame structures 16, and a seat back 18 extending upwardly from a rear edge 14a of the seat cushion. The lower edge 18a of seat back 18 coacts with the rear edge 14a of the seat cushion to define a crease 20 between the seat cushion and the seat back.

A child restraint seat 22 of standard form is shown positioned over seat cushion 14. However, seat cushion 14 is relatively short (as might be encountered, for example, in the rear seat of an extended cab pick-up truck) and specifically has an effective length SCW significantly shorter than the length CRSW of the standard child restraint seat 22 so that if the car seat were positioned directly on the seat cushion the front or leading edge 22a of the child seat would extend forwardly in unsupported cantilever fashion beyond the front edge 14b of the seat cushion with the result that the support of the child restraint seat would be very unstable and generally unsatisfactory.

According to the invention, an adapter or stabilizing device 24 is provided to provide a more secure installation of the child seat in the vehicle The adapter 24 may be formed of injection molded plastic and includes a main body platform portion 24a defining a seat support surface 24b having a length at least as great as the length CRSW of the child restraint safety seat, a leg portion 24c extending downwardly from a front edge 24d of the platform portion for engagement with the floor of the vehicle at a location forwardly of the front edge 14b of the seat cushion, and a tail portion 24e extending rearwardly and arcuately downwardly from a rear edge 24f of the platform portion. Support surface 24b may be recessed downwardly with respect to the upper plane of platform portion 24a to provide a pocket 25 for receipt of the lower edge portion 22b of the child restraint seat.

Leg 24c includes a cut-out 24h along a lower edge 28i of the leg portion sized to accommodate the drive shaft tunnel 12 and allow the leg portion to straddle the drive shaft tunnel. If desired, adjusters 26 may be screw-threaded into the lower end of each side portion 24j of the leg portion to provide screw-threaded height adjustability for the adapter.

In use of the invention adapter in a short seat environment such as encountered in the rear of a typical extended cab pick-up truck, tail portion 24e is inserted into the crease 20 between the seat cushion and the seat back to position the adapter centrally with respect to the vehicle seat assembly whereafter the adapter may be lowered to position the cut-out 24h over drive shaft tunnel 12 and allow the leg portion of the adapter to straddle the drive shaft tunnel whereafter, if desired, adjusters 26 may be adjusted to provide a desired attitude or orientation for the platform portion 24a of the adapter.

In this position, it will be seen that the platform portion 24a of the adapter overlies the seat cushion 14 with the forward edge 24i of the support surface 24b positioned forwardly of the leading edge 14b of the seat cushion. Child seat 22 may now be positioned in the pocket 25 defined by surface 24b whereafter the center seat belt assembly 28 of the seat installation may be passed in known manner through cut-outs 22c in the seat back of the child safety seat and snappingly secured to buckle 30 so that the seat belt assembly serves to press the child restraint seat downwardly against the support surface of the platform portion of the adapter to secure the child seat to the adapter and secure the adapter to the seat cushion.

It will be seen that the entire lower footprint of the child seat is totally supported by the support surface 24b so that the support of the child seat is positive, total, and satisfactory in all respects. When the seat belt 28/30 is removed from the child seat and the child seat removed, tail portion 24e serves to maintain the adapter in position on the seat assembly, ready for its next use.

The adapter of the invention, and the vehicle seat assembly made possible utilizing the adapter of the invention in conjunction with a standard vehicle seat assembly, allows a child seat to be firmly and positively secured to the vehicle seat assembly even in situations where the standard child seat has a length greater than the effective length of the seat cushion of the vehicle seat assembly such, for example, as in the short seats encountered in the rear of extended cab pick-ups.

Whereas a preferred embodiment of the invention has been illustrated and described in detail, it will be apparent that various changes may be made in the disclosed embodiment without departing from the scope or spirit of the invention.

The invention claimed is:

1. A child restraint safety seat assembly for use on a vehicle seat assembly of the type including a seat back and a seat cushion positioned in overlying relation to a floor of the vehicle, the assembly including:
   a child restraint safety seat;
   a stabilizing device having a rigid L-shaped configuration including a platform portion, defining a seat support surface having a longitudinal dimension measured longitudinally of the vehicle at least as great as a longitudinal dimension of the child restraint safety seat and a lateral dimension, measured transversely on the vehicle, at least as great as a lateral dimension of the safety seat, and a leg portion extending rigidly downwardly from a front edge of the platform portion for engagement with the floor of the vehicle at a location forwardly of a front edge of the seat cushion, the leg having a lateral dimension generally corresponding to the lateral dimension of the platform portion and being operative for positioning the platform portion in overlying relation to the seat cushion with a front edge of the seat support surface positioned forwardly of the front edge of the seat cushion, whereby for providing a support surface in overlying relation to the seat cushion having a longitudinal dimension sufficient for totally supporting the child seat in a position forwardly of the seat back.

2. A stabilizing device according to claim 1 wherein the stabilizing device further includes a tail portion extending rearwardly from a rear edge of the platform portion and sized for positioning in a crease between a lower edge of the seat back and a rear edge of the seat cushion.

3. A stabilizing device according to claim 1 wherein:
   the leg potion includes a cut-out along a lower edge thereof sized for accommodating a drive shaft tunnel projecting from the drive shaft tunnel.

4. A child restraint safety seat assembly according to claim 1 wherein the platform portion includes an upwardly opening pocket formed in a top surface of the platform portion sized to receive a lower edge portion of the child restraint seat, whereby for precluding displacement of the child restraint seat relative to the platform portion.

5. A vehicle seat assembly comprising a seat cushion positioned in overlying relation to a floor of a vehicle and having a front edge;
   a seat back extending upwardly from a rear edge of the seat cushion;
   a stabilizing device having a rigid L-shaped configuration including a rigid platform portion positioned in overlying relation to the seat cushion and including a front edge positioned forwardly of the front edge of the seat cushion and a leg portion extending rigidly downwardly from a front edge of the platform portion for engagement with the floor of the vehicle and operative for supporting the front edge of the platform portion in a position forwardly of and above the front edge of the seat cushion;
   a child restraint seat positioned on the platform portion of the stabilizing device; and
   a seat belt adapted to be secured to the vehicle at a position below the child restraint seat and engaging the child restraint seat to press the child restraint seat downwardly against the platform portion.

6. A vehicle seat assembly according to claim 5 wherein:
   the seat cushion has a longitudinal dimension less than a longitudinal dimension of the child restraint seat; and
   the platform portion defines a support surface for the child restraint system having a longitudinal dimension at least as great as the longitudinal dimension of the child restraint seat.

7. A vehicle seat assembly according to claim 5 wherein the stabilizing device further includes a tail portion extending rearwardly from a rear edge of the platform portion and sized to be positioned in a crease between a lower edge of the seat back and a rear edge of the seat cushion.

8. A vehicle seat assembly comprising:
   a seat cushion positioned in overlying relation to a floor of the vehicle and having a front edge;
   a seat back extending upwardly from a rear edge of the seat cushion;
   a stabilizing device having a rigid L-shaped configuration including a rigid platform portion positioned in overlying relation to the seat cushion and including a front edge positioned forwardly of the front edge of the seat cushion and a leg portion extending rigidly downwardly from a front edge of the platform portion for engagement with the floor of the vehicle and operative for supporting the front edge of the platform portion in a position forwardly of and above the front edge of the seat cushion, the leg portion including a cut-out along a lower edge thereof sized for accommodating a drive shaft tunnel projecting from the vehicle floor and allowing the leg portion to straddle the drive shaft tunnel, and a child restraint seat positioned on the platform portion of the stabilizing device.

9. A vehicle seat assembly comprising:

a seat cushion positioned in overlying relation to a floor of the vehicle and having a front edge;

a seat back extending upwardly from a rear edge of the seat cushion;

a stabilizing device having an L-shaped configuration including a rigid platform portion positioned in overlying relation to the seat cushion and including a front edge positioned forwardly of the front edge of the seat cushion and a leg portion extending downwardly from a front edge of the platform portion for engagement with the floor of the vehicle and operative for supporting the front edge of the platform portion in a position forwardly of and above the front edge of the seat cushion;

a child restraint seat positioned on the platform portion of the stabilizing device; and a seat belt adapted to be secured to the vehicle and engaging the child restraint seat for pressing the child restraint seat downwardly against the platform portion;

the platform portion including an upwardly opening pocket formed in an upper surface of the platform portion sized for receiving a lower edge portion of the child restraint seat; and the child restraint seat being seated in the pocket and the seat belt acting to press the child restraint seat downwardly and rearwardly into the pocket.

* * * * *

UNITED STATES PATENT AND TRADEMARK OFFICE
CERTIFICATE OF CORRECTION

PATENT NO. : 5,820,215
DATED : October 13, 1998
INVENTOR(S) : Kurt R. Dreisbach

It is certified that error appears in the above-indentified patent and that said Letters Patent is hereby corrected as shown below:

Column 4, line 20, delete "projecting from the drive shaft tunnel." and insert -- projecting from the vehicle floor and allowing the leg portion to straddle the drive shaft tunnel. --

Signed and Sealed this

Twenty-third Day of February, 1999

Attest:

Q. TODD DICKINSON

Attesting Officer

Acting Commissioner of Patents and Trademarks